Patented Jan. 8, 1929.

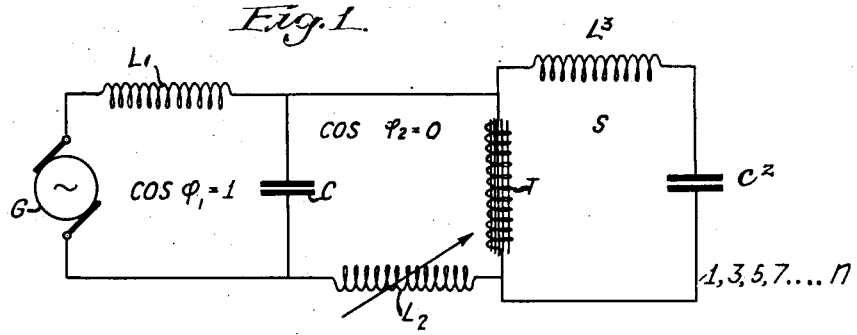
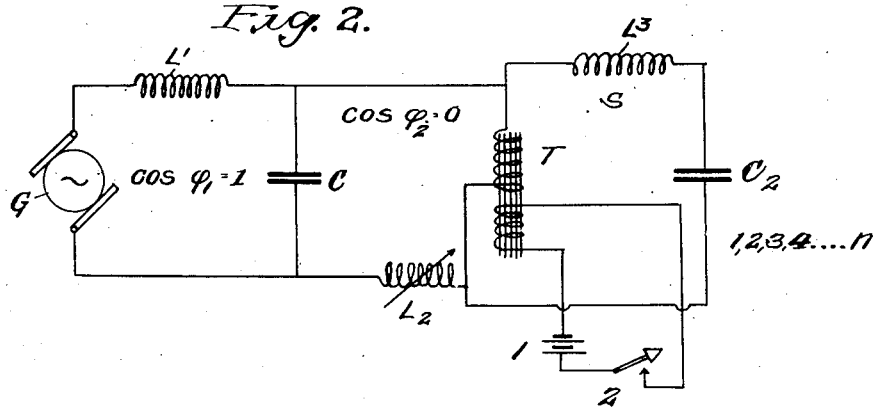

1,698,284

UNITED STATES PATENT OFFICE.

GEORG GRAF von ARCO AND MENDEL OSNOS, OF BERLIN, GERMANY, ASSIGNORS TO GESELLSCHAFT FÜR DRAHTLOSE TELEGRAPHIE M. B. H., OF BERLIN, GERMANY, A CORPORATION OF GERMANY.

ARRANGEMENT FOR OBTAINING LARGE OUTPUTS IN FREQUENCY CHANGERS.

Application filed October 25, 1922, Serial No. 596,901, and in Germany August 2, 1921.

Applications have been filed in Germany G 54,489, on August 2, 1921, and in England #16,286, on June 12, 1922, on my behalf.

The invention relates to all kinds of stationary period or frequency changers in which the iron core is magnetized by alternating current of a certain frequency and transmits its energy to an oscillating circuit of a higher frequency. This higher frequency may be an even or odd multiple of the input frequency. The invention is applicable therefore to frequency changers which double and triple the input frequency as well as to frequency changers which within a single stage, transform the frequency into higher even or odd multiples. The invention relates to frequency changers with and without direct current premagnetization.

The invention is based on the well known theory that two conditions must be satisfied at each frequency transformation; first the losses in the machine must be held to a minimum and second the highest possible magnetizing current must be supplied to the frequency changer. In accordance with the present invention, this object is attained by providing two alternating current circuits, one of which contains the machine and the other the iron core frequency changer. Both circuits are tuned to the same input frequency but in such a manner that in the machine circuit the power factor approaches 1, whereas in the frequency changer circuit it is as near to 0 as possible, i. e. the largest possible magnetizing current flows through the frequency changer and is produced by means of a minimum effort of the machine.

Fig. 1 represents an arrangement embodying my invention.

Fig. 2 is an arrangement similar to Fig. 1 but using direct current premagnetization on the core of the frequency changer.

Referring to Fig. 1, the high frequency generator G is so tuned by means of inductance $L^1$ and capacity C that the power factor of the generator circuit, denoted by cos $\phi_1 = 1$. The frequency changer T comprising a magnetic core with an inductive winding thereon is connected in parallel with the condenser C through the inductance $L^2$ which is of such value that the magnetizing current flowing through the frequency changer is caused to be as strong as possible and the power factor in the frequency changer circuit, denoted by cos $\phi_2$, to be as near to zero as possible.

The circuit in which the working factor approaches unity consists of the generator G, inductance $L_1$ and capacity C. Due to voltage resonance the voltage drops across C and across $L_1$ will be equal and much higher than that of the machine G. The voltage across C is impressed on a circuit in which the working factor approaches zero due to a predominance of inductance. This circuit comprises frequency changer T and inductance $L_2$.

Of course, these two circuits react on each other to a certain extent so that the conditions of unity and zero working factors are never reached, but if the constants of these circuits are properly proportioned, this condition should be closely approached.

The voltage drop across the frequency changer T caused by the heavy current flowing thru its winding is utilized to produce the desired harmonics. Since the heavy current flowing thru the frequency changer is sufficient to saturate the core the current wave will be distorted from a true sine wave in the well known manner. Similarly the voltage drop wave will be distorted from a true sine wave.

As no direct current premagnetization is used in this case, only odd harmonics can be obtained since the positive half of the wave form of the voltage drop across the frequency changer T is the same as the negative half of the wave. According to well known theory there can be no even harmonics making up this distorted voltage wave when the negative half has the same shape as the positive half.

In order to obtain any desired odd harmonic in the circuit S the capacitance $C_2$ and inductance $L_2$ must be adjusted to resonate that harmonic.

Referring to Fig. 2, the arrangement is the same as that in Fig. 1 except that a direct current winding is placed on the core of the frequency changer T. The direct current winding is in series with battery 1 and key 2. This arrangement makes it possible to premagnetize the core of the frequency changer T so that the positive half of the wave form of the voltage drop across the frequency changer is no longer the same as the negative half. In this case, according to theory, the distorted wave is made up of both even and odd harmonics. So by adjusting inductance $L_3$ and capacitance $C_2$ any desired harmonic may be accentuated in circuit S.

For an n-fold multiplication of the input frequency the time it takes the input flux-producing current to change from zero to a value sufficient to saturate the iron core of the frequency changer must be equal nearly to $\frac{1}{4n}$. This requirement is necessary to obtain a maximum transference of energy from the core of the frequency changer to the circuit S.

Even were it only desired to obtain an odd harmonic, the direct current premagnetization is of value, because the production of the desired harmonic may be controlled by a current controlling device, as for instance, a key 2, as shown in Fig. 2.

Having described our invention, what we claim is:

1. In combination, a saturable core frequency changer element, a condenser element in parallel therewith, a source of input energy, and a tuning reactance in series with said parallel elements and said source and adjusted to series resonance therewith.

2. In combination, a saturable core frequency changer element, a condenser element in parallel therewith of more than sufficient capacitance for parallel resonance with the frequency changer element, a source of input energy, and a tuning inductance in series with said parallel elements and said source and adjusted to series resonance therewith.

3. In combination, a saturable core frequency changer and a tuning inductance in series therewith, a condenser in parallel with said changer and inductance, a source of input energy, and a tuning reactance in series with said parallel circuit and said source and adjusted to series resonance therewith.

GEORG GRAF v. ARCO.
MENDEL OSNOS.